United States Patent
Ha et al.

(10) Patent No.: US 8,648,516 B2
(45) Date of Patent: Feb. 11, 2014

(54) ELASTOMERIC BRIDGE BEARINGS HAVING A PIEZOELECTRIC DEVICE

(75) Inventors: Dong Ho Ha, Seoul (KR); Nam Seo Goo, Seoul (KR); Moon Sig Yoo, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 137 days.

(21) Appl. No.: 13/496,970

(22) PCT Filed: Nov. 30, 2009

(86) PCT No.: PCT/KR2009/007080
§ 371 (c)(1),
(2), (4) Date: Mar. 19, 2012

(87) PCT Pub. No.: WO2011/040675
PCT Pub. Date: Apr. 7, 2011

(65) Prior Publication Data
US 2012/0176003 A1    Jul. 12, 2012

(30) Foreign Application Priority Data
Sep. 29, 2009 (KR) .................. 10-2009-0092129

(51) Int. Cl.
*H02N 2/00* (2006.01)
(52) U.S. Cl.
USPC ............................................. 310/339
(58) Field of Classification Search
USPC .................. 310/339, 338, 330–332; 14/73.5
IPC ....................................................... H02N 2/00
See application file for complete search history.

(56) References Cited

U.S. PATENT DOCUMENTS

| 3,544,415 | A | * | 12/1970 | Price et al. ................ | 14/73.5 |
| 4,404,490 | A | * | 9/1983 | Taylor et al. .............. | 310/339 |
| 7,489,045 | B1 | * | 2/2009 | Bradford et al. .......... | 290/1 R |
| 7,830,071 | B2 | * | 11/2010 | Abramovich et al. ..... | 310/339 |

FOREIGN PATENT DOCUMENTS

| JP | 2005-090152 A | 4/2005 |
| KR | 20-0388055 Y1 | 6/2005 |
| KR | 10-0769645 B1 | 10/2007 |

OTHER PUBLICATIONS

English Language Abstract of JP 2005-090152 A.
English Language Abstract of KR 10-2007-0092880 A which is an application publication of KR 10-0769645 B1.
International Search Report of PCT/KR2009/007080 mailed on Oct. 15, 2010.

\* cited by examiner

*Primary Examiner* — Thomas Dougherty
*Assistant Examiner* — Karen B Addison
(74) *Attorney, Agent, or Firm* — Rabin & Berdo, P.C.

(57) ABSTRACT

A resilient support for a bridge includes: an upper plate fixedly installed on the undersurface of the bridge deck panel; a base plate fixedly installed on the top surface of the pier; an upper fixed panel and a lower fixed panel fastened and fixed by fastening bolts to the upper plate and to the base plate, respectively; and a rubber pad, the top and bottom surfaces of which are thermally bonded and fixed to the upper and lower fixed panels, respectively, and including a plurality of steel panels in a multi-stack configuration filled therein, wherein the resilient support is configured with a plurality of piezoelectric devices for converting vibrations transmitted from the bridge deck panels into electric energy, and the piezoelectric devices are stacked between each of the steel panels within the rubber pad.

8 Claims, 7 Drawing Sheets

ELASTOMERIC BRIDGE BEARINGS HAVING A PIEZOELECTRIC DEVICE

TECHNICAL FIELD

The present invention relates, in general, to a bridge support and, more particularly, to a resilient bridge support with piezoelectric elements, which acts as a bridge seat installed to support a deck plate of a bridge, measures a load of each vehicle on a deck plate of the bridge, and puts vibrations generated during the passing of the vehicles to practical use as electrical energy.

BACKGROUND ART

In general, electricity is a type of essential energy that has become a part of life in modern society. Electrical energy is already being obtained by various methods, such as thermal power, water power, nuclear power generation, and the like, and has excellent properties. However, there are many problems, such as the exhaustion of resources by ongoing energy generation and the resultant limits of energy generation, high cost, and the environmental pollution caused by power generation systems. Therefore, countries aware of such problems have recently attempted to steadily increase their investment in developing alternative energies. For example, power generation apparatuses using sunlight as an alternative energy source have been intensively developed. These power generation apparatuses are constituted of solar cells adapted to directly receive the sunlight, and can charge a voltage generated from the solar cells into a storage battery through a constant voltage circuit that constantly maintains the voltage of the solar cells, such that the storage battery can be used as an auxiliary power supply when needed.

However, disadvantages of the power generation using the solar cells include low efficiency, there being a great difference in the amount of electricity generated relative to the quantity of sunlight, and not generating electricity at night. Thus, such power generation cannot serve as a primary energy source in some countries, but only as an auxiliary or experimental energy source.

In addition, energy generation apparatuses using tidal power, wind power, or water power generation can be used as an auxiliary power supply only in regions having the proper natural conditions. Therefore, such energy generation apparatuses can generate a lower voltage than those expected, be largely subject to restrictions with respect to the surrounding environment, and require too much initial plant investment. As a result, energy generation apparatuses cannot be considered as being common.

Therefore, the interest in using energy recycling as a further alternative energy has increased. Accordingly, the present invention is devised to convert vibrational energy generated by a bridge into electrical energy by using energy recycling to supply the electric power needed by the bridge.

According to a recent report, there are approximately 23,000 bridges throughout South Korea and this number will increase more in future. Also, the scale and length of bridges are being gradually increased. The structure of such bridges has a deck plate installed on top of piers and the bridges are subject to dynamic loads which vary by the minute because vehicles and like pass at high speed over the bridge. For big bridges, since the length of the deck plate is increased, an expansion length of the deck plate due to thermal deformation in response to temperature changes depending on a change in the seasons can also increase. Therefore, such big bridges have to be designed to allow there to be relative motion in contact portions between the deck plate and the piers. Also, in case a great impact force should be applied to the bridges in a horizontal direction due to an earthquake, the support structure of the bridges needs to be able to alleviate and reduce the impact forces in the horizontal direction. For this purpose, the bridges have resilient supports installed between the deck plate and the piers to support the deck plate while responding to displacement of the deck plate, such that the impact forces applied to the deck plate can be reduced.

Each resilient support of the bridges as described above is configured to reduce the impact force occurring on the bridges and generates vibrational energy due to the impact forces occurred on the bridges and transfers it unchanged to the resilient support.

However, according to the related art, the resilient support, to which the vibrational energy generated by the load of the deck plate of the bridge and the passage of vehicles are transferred, only reduces the impact force of the vibration energy, and wastes the vibration energy without recycling it.

DISCLOSURE

Technical Problem

Accordingly, an object of the present invention is intended to provide a resilient bridge support adapted to recycle vibrations generated in a bridge, wherein a piezoelectric element capable of converting mechanical energy into electrical energy is used in the resilient bridge support so as to obtain eco-friendly energy required to maintain the bridge.

Technical Solution

In order to achieve the above object, the present invention provides a resilient bridge support, including: an upper plate fixedly installed on a bottom surface of a deck plate of a bridge, a base plate fixedly installed on a top surface of a pier of the bridge, upper and lower mounting plates each fixed on the upper plate and the base plate by fastening bolts, and a rubber pad fixed at upper and lower surfaces thereof on the upper and lower mounting plates, respectively, by thermal fusion and having a plurality of steel plates embedded therein in a multi-layer form, wherein thin plate-shaped piezoelectric elements for converting vibrations transferred thereto from the deck plate into electrical energy are provided in the resilient bridge support, and the piezoelectric elements are disposed between the steel plates inside the rubber pad.

Advantageous Effects

According to the present invention, the resilient bridge support, which is installed between the deck plate and the pier of the bridge to reduce the impact force generated by a load and the deformation of the deck plate of the bridge, has a plurality of piezoelectric elements mounted therein, such that the piezoelectric effect can convert the vibrational energy generated by the load of the deck plate of the bridge and the passage of vehicles into electrical energy. Then, the electrical energy can be converted into an electrical current capable of charging a storage battery by an energy conversion means. Therefore, the electrical energy charged into the storage battery can supply the electric power required for the bridge, such as sensors for maintenance of the bridge, or street lamps. As a result, the vibrational energy of the bridge, which would otherwise only be wasted in the bridge, can be recycled into electrical energy by the piezoelectric elements provided in the resilient support and thus can be utilized as an alternative energy.

In particular, the piezoelectric elements are stacked between the steel plates such that the piezoelectric elements can be protected by the steel plate when a horizontal deformation is generated in the resilient support, thereby preventing equipment damage.

<Reference Numerals List>

| | |
|---|---|
| 1: piezoelectric element | 2: storage battery |
| 3: coil-shaped electric wire | 10: base plate |
| 11: anchor socket | 20: lower mounting plate |
| 22, 42: fastening bolt | 30: rubber pad |
| 31: steel plate | 31a: electric wire guide hole |
| 32: projection | 33: paraffin layer |
| 34: cut-out portion | 40: upper mounting plate |
| 50: upper plate | 51: anchor socket |

BEST MODE

Reference will now be made in greater detail to preferred embodiments of the invention with reference to the accompanying drawings.

Figure 1:
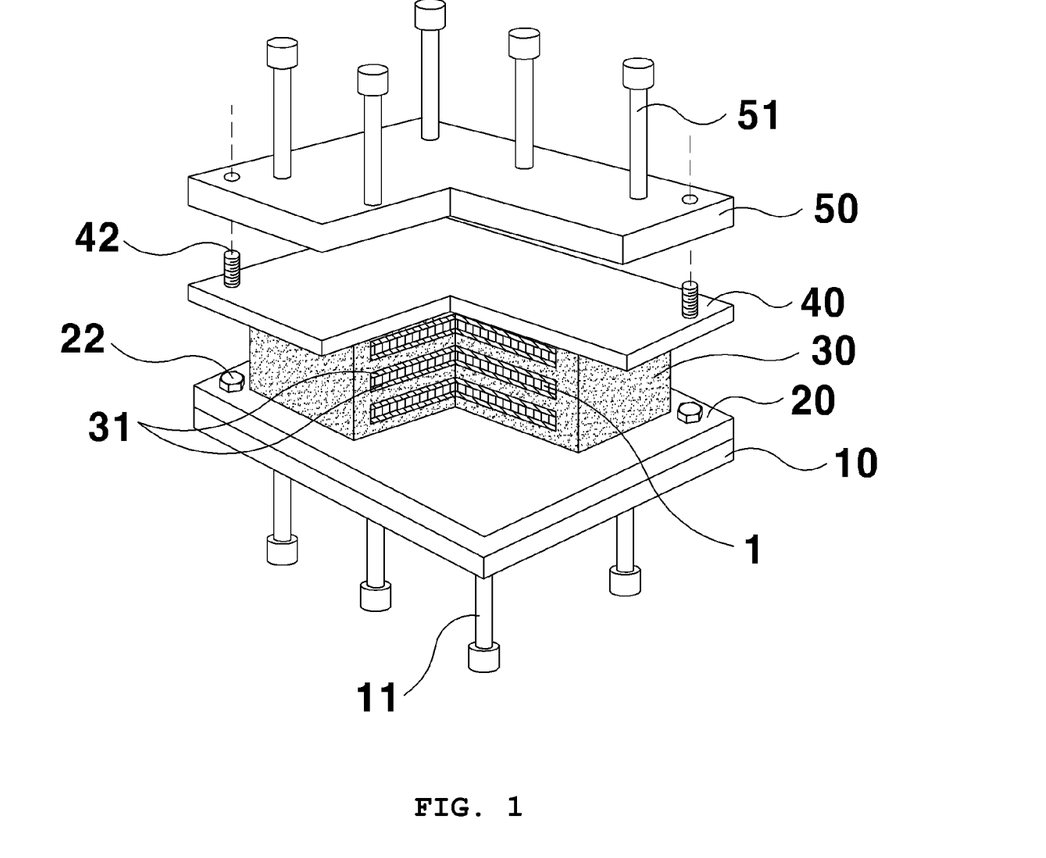
FIG. 1 is an exploded view of a resilient bridge support according to the present invention.
Figure 2:
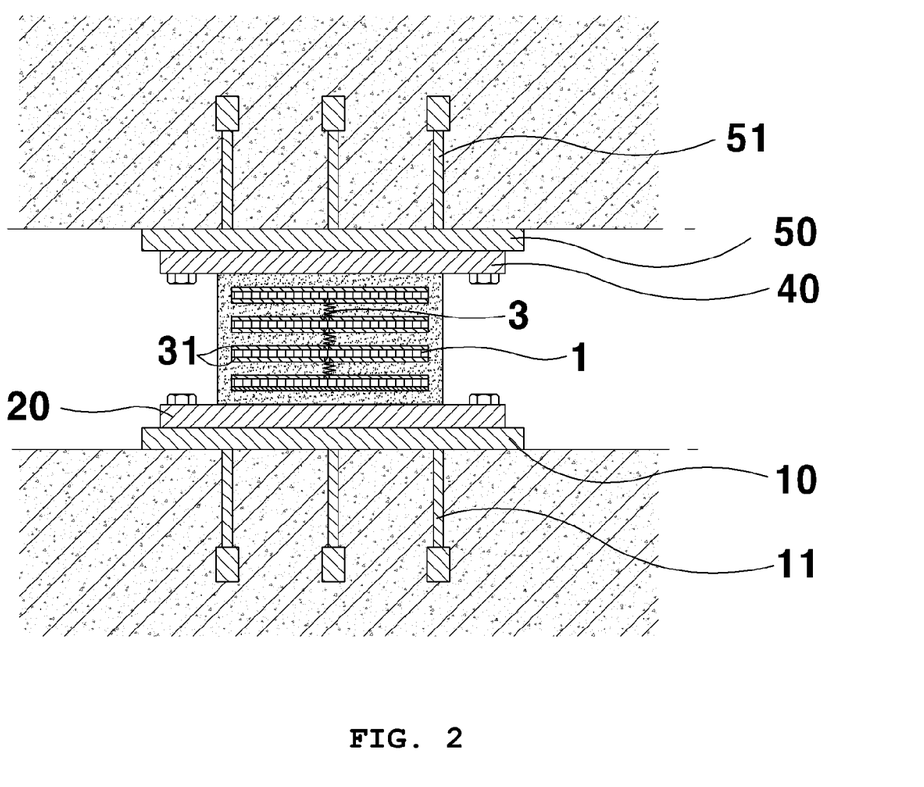
FIG. 2 is a cross-sectional view showing an installed state of the resilient bridge support according to the present invention.

Firstly, a general structure of a resilient bridge support having piezoelectric elements according to the present invention will be described. The resilient bridge support includes an upper plate 50 fixedly installed on a bottom surface of a superstructure (deck plate) of a bridge, a base plate 10 fixedly installed on a top surface of an infrastructure (pier) of the bridge, an upper mounting plate 40 and a lower mounting plate 10 each fixed on opposing surfaces of the upper plate 50 and the base plate 10, and a rubber pad engaged between the upper and lower plates 40 and 20. The upper and lower mounting plates 40 and 20 are fixed on the upper plate 50 and the base plate 10, respectively, by fastening bolts 42 and 22.

Figure 3:
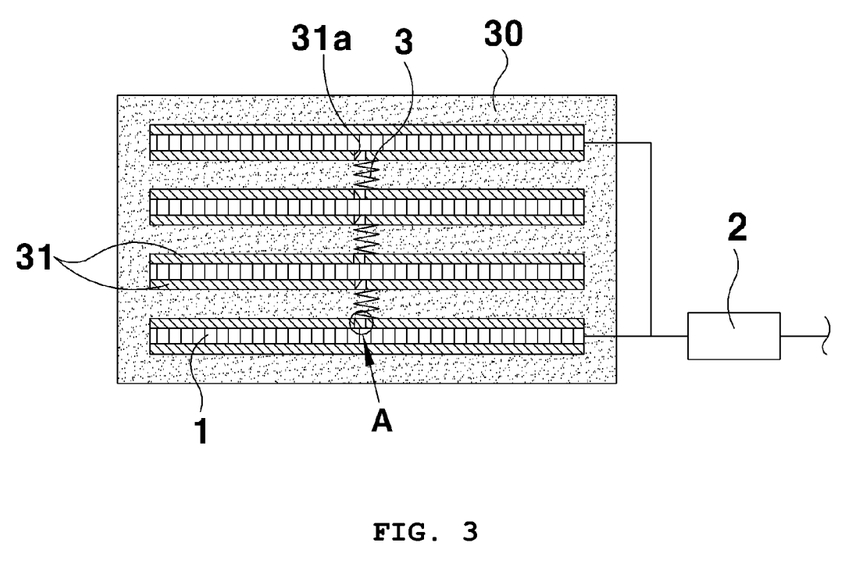
FIG. 3 is a detailed cross-sectional view of a rubber pad having piezoelectric elements according to the present invention.

In addition, a plurality of steel plates 31 are arranged separated by a predetermined interval inside the rubber pad 30 to restrict expansion of the rubber pad 30, such that the load carrying capacity thereof when under a vertical load can be increased and thus the vertical load can be compensated for.

Each of upper and lower surfaces of the rubber pad 30 as described above are in tight contact and thermally fused on the upper and lower mounting plates 40 and 20, respectively.

In particular, the rubber pad 30 according to the present invention has piezoelectric elements 1 mounted therein to convert vibrational energy generated due to a load of the deck plate of the bridge and the passage of vehicles into electrical energy. The piezoelectric elements 1 have a thin plate shape and are disposed to engage between two steel plates 31 to form a stacked structure, such that upper and lower portions thereof can be protected by the steel plates 31.

Specifically, as shown in FIG. 3, a plurality of piezoelectric elements 1 are stacked to be put in surface contact with the steel plates 31 and are connected to a storage battery 2 to charge it with electric current generated by each of the piezoelectric elements 1.

Figure 4:
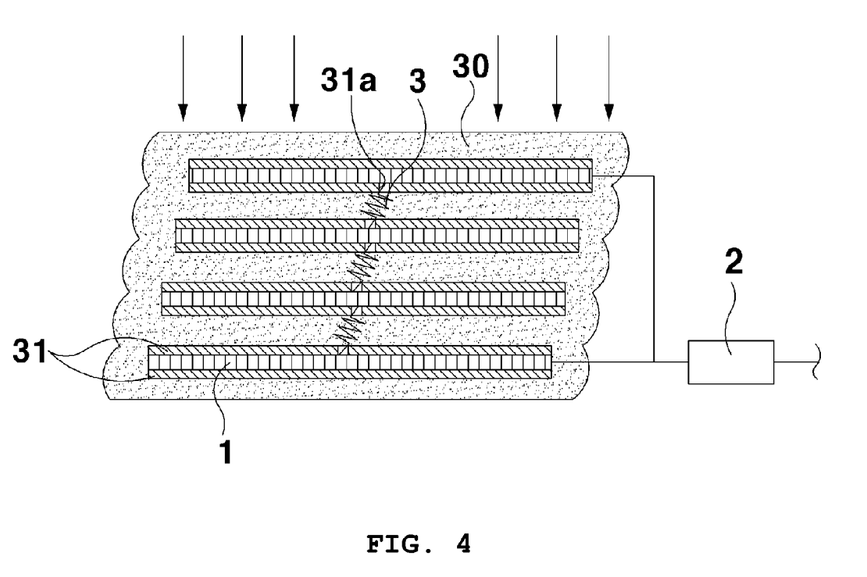
FIG. 4 is an enlarged view of region A in FIG. 3.

Also, the piezoelectric elements 1 are electrically interconnected in series to each other. In this case, to prevent an electrical cut-off even when a shear deformation occurs in the rubber pad 30, the piezoelectric elements 1 are interconnected by coil-shaped electric wires 3 of a helical shape, and the steel palates 31 are provided with electric wire guide holes 31a through which the coil-shaped electric wires 3 extend, as shown in FIG. 4.

Each of reference numerals 11 and 51 which are indicated in the drawings but not described in detail herein designate anchor sockets each adapted to be embedded and fixed in the concrete of the pier and the deck plate.

Hereafter, the operation and effects accompanied by the installation of the resilient bridge support according to the present invention having a configuration as described above will be described.

Firstly, when the resilient bridge support of the present invention has been installed between the pier and the deck plate, vibrational forces generated due to the deck plate load of the bridge and the passage of vehicles are transferred into the rubber pad 30, and thus piezoelectric effect of the piezoelectric elements 1 mounted inside the rubber pad 30 generates electrical energy.

Specifically, a pressure force by the steel plates 31 is transferred to each of the piezoelectric elements 1 by the ability of the rubber pad 30 to change shape, and thus the pressure is applied to each of the piezoelectric elements 1 interconnected in series to each other to generate an electric power. In this case, AC current/voltage transmitted from the piezoelectric elements 1 is transformed by a transformer (not shown), and then converted into DC voltage by a rectifier circuit. The converted voltage is charged into the storage battery 2.

Therefore, the current charged into the storage battery 2 can be utilized as an electrical power source for facilities, such as street lamps on the bridge or an apparatus for monitoring overweight vehicles in a wired or wireless manner.

Figure 5:
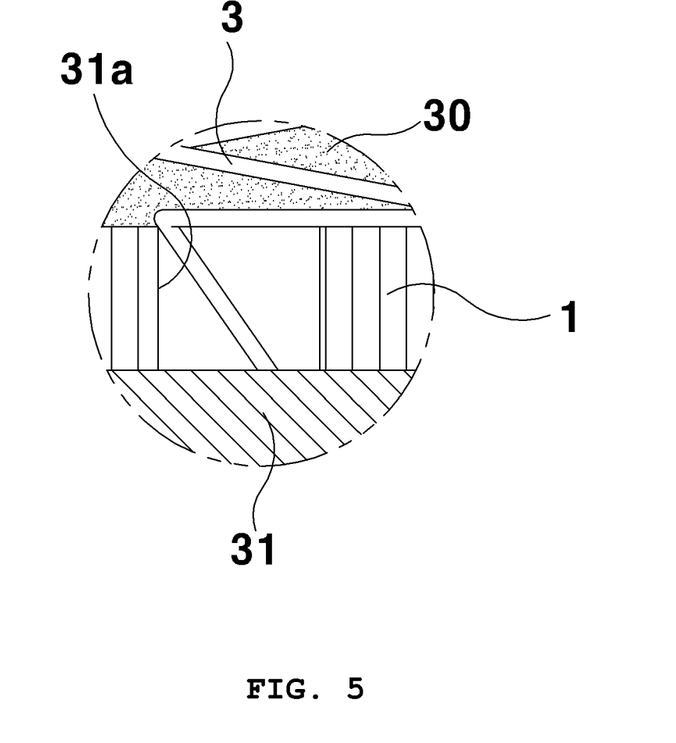
FIG. 5 is a view showing horizontal deformation occurring in the rubber pad according to the present invention.

In particular, even when a horizontal deformation together with such a vertical load are generated in the resilient bridge support, the piezoelectric elements 1 of the present invention can be protected by the steel plate 31 to prevent them from being damaged.

Also, the intensity of the current generated by the piezoelectric elements 1 can be preferably used to indirectly measure the weights of vehicles by evaluating a change of a surcharge load of the deck plate based on the intensity of the current.

Furthermore, fluctuation signals of the current generated in the piezoelectric elements 1 can be used to provide information required to conduct an integrity assessment of the bridge structure.

Figure 6:
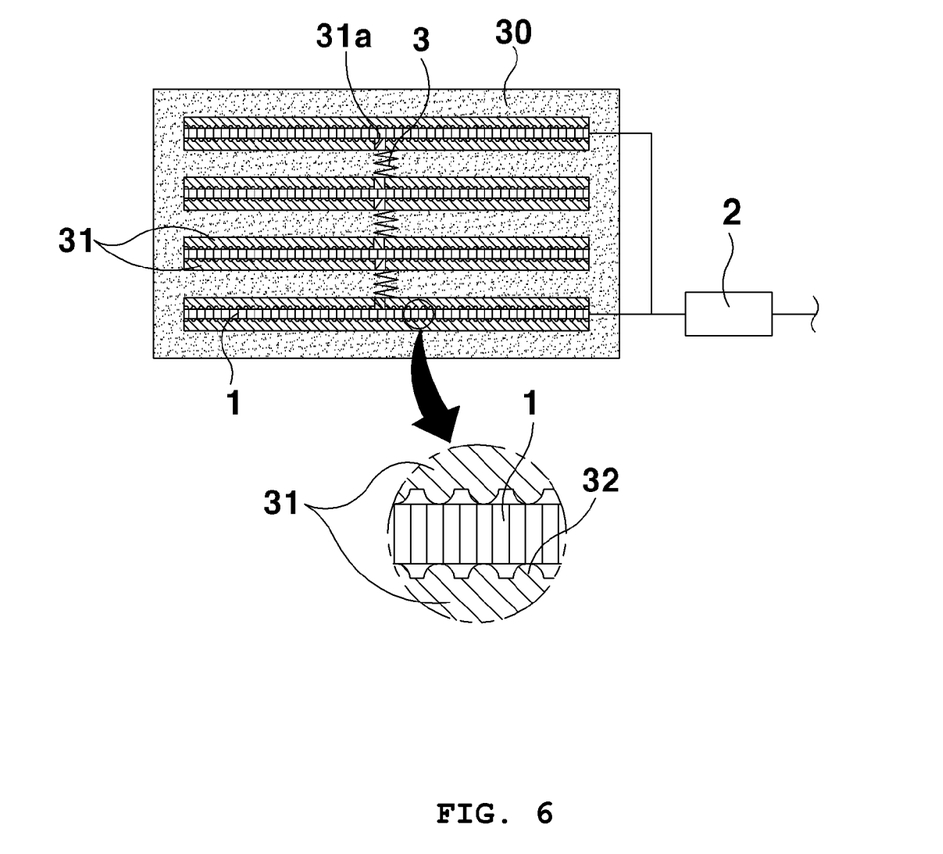
FIG. 6 is a detailed cross-sectional view of a rubber pad according to another embodiment of the present invention.

In addition, FIG. 6 shows another embodiment of the present invention, in which projections 32 are formed on surfaces of steel plates 31 to prevent adverse effects, such as oxidization and the like, due to surface contact between piezoelectric elements 1 and steel plates 31.

Specifically, as shown, surfaces of the steel plates 31 facing the piezoelectric elements 1 are provided with a plurality of projections 32 to form contact points between the piezoelectric elements 1 and the steel plates 31 and thus to minimize the contact area therebetween. As a result, adverse effects due to oxidization of the steel plates 31 can be minimized, and also pressure forces can be applied in point form to achieve more stable power generation.

Figure 7:
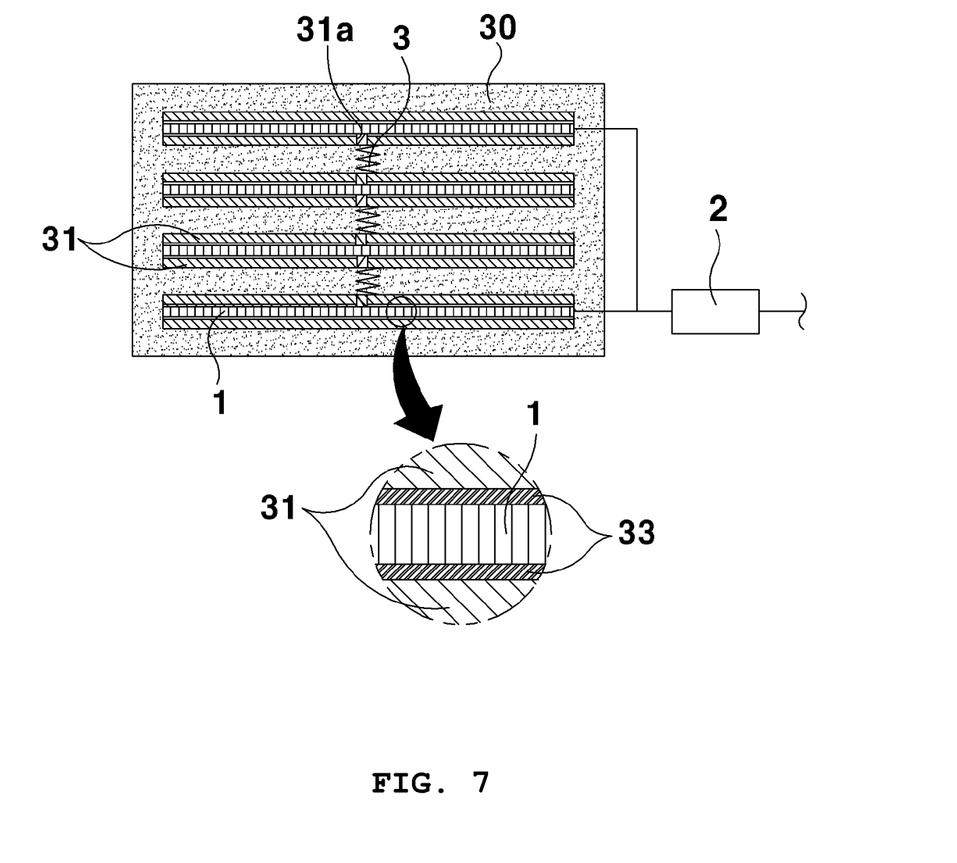
FIG. 7 is a detailed cross-sectional view of a rubber pad according to a further embodiment of the present invention.

Also, FIG. 7 shows a coating structure of steel plates 31 in a further embodiment of the present invention, in which surfaces of the steel plates 31 facing piezoelectric elements 1 are coated with paraffin layers 33 providing electrical insulation.

Specifically, the paraffin layers 33 are preferably formed of a composition which contains 50 to 85 wt % of flowable paraffin as a primary component and is added with 3 to 10 wt % of acrylic-based redispersion powder resin, 1 to 6 wt % of calcium hydroxide, and 1 to wt % of methyl ethyl hydroxypropyl ethyl cellulose (MEHEC) to consistently maintain the thickness uniform.

In this time, to provide mixing stability of the above components, 0.5 to 2 wt % of butyl acrylate monomer (BAM) may be additionally mixed.

As described above, when the paraffin layers 33 are formed on the surfaces of the steel plates 31, electrical insulation can be provided between the steel plates 31 and the piezoelectric elements 1, and thus the leakage of electrical energy generated in the piezoelectric elements 1 can be prevented. As a result, the supply of electrical energy to the storage battery 2 can be more stable.

Although preferred embodiments of the present invention have been described and illustrated in the forgoing description, it is apparent that the resilient bridge support having piezoelectric elements according to the present invention may be variously modified by those skilled in the art.

However, it should be appreciated that such modifications are not intended to be interpreted separately from the scope and spirit of the present invention as disclosed in the accompanying claims, but are intended to fall within the scope and spirit of the present invention.

What is claimed is:

1. A resilient bridge support, including: an upper plate fixedly installed on a bottom surface of a deck plate of a bridge; a base plate fixedly installed on a top surface of a pier of the bridge; an upper mounting plate and a lower mounting plate each fixed on the upper plate and the base plate by fastening bolts; and a rubber pad 30 fixed at upper and lower surfaces thereof on the upper and lower mounting plates, respectively, by thermal fusion and having a plurality of steel plates embedded therein in a multi-layer form, wherein a plurality of piezoelectric elements for converting vibrations transferred thereto from the deck plate into electrical energy are arranged at different heights at predetermined intervals in the resilient bridge support; and each of the piezoelectric elements forms one set together with two steel plates and is interposed between the steel plates inside the rubber pad.

2. The resilient bridge support according to claim 1, wherein the piezoelectric elements have a thin plate shape and make direct surface contact with the steel plate to allow pressure forces to be directly transferred thereto, and the steel plate includes a plurality of projections on surfaces thereof that face the piezoelectric elements.

3. The resilient bridge support according to claim 2, wherein surfaces of the steel plates facing the piezoelectric elements are coated with paraffin layers providing electrical insulation.

4. The resilient: bridge support according to claim 1, wherein the piezoelectric elements 1 are electrically interconnected in series to each other by coil-shaped electric wires to accommodate a shear deformation of the rubber pad, and the steel plates are provided with electric wire guide holes for guiding the coil-shaped electric wires.

5. The resilient bridge support according to claim 4, wherein surfaces of the steel plates facing the piezoelectric elements are coated with paraffin layers providing electrical insulation.

6. The resilient bridge support according to claim 1, wherein surfaces of the steel plates facing the piezoelectric elements are coated with paraffin layers providing electrical insulation.

7. The resilient bridge support according to claim 6, wherein the paraffin layers contain acrylic-based redispersion powder resin, calcium hydroxide, and methyl ethyl hydroxypropyl ethyl cellulose (MEHEC) to consistently maintain thickness uniform.

8. The resilient bridge support according to claim 7, wherein butyl acrylate monomer (BAM) is further mixed in the paraffin layers.

* * * * *